United States Patent Office

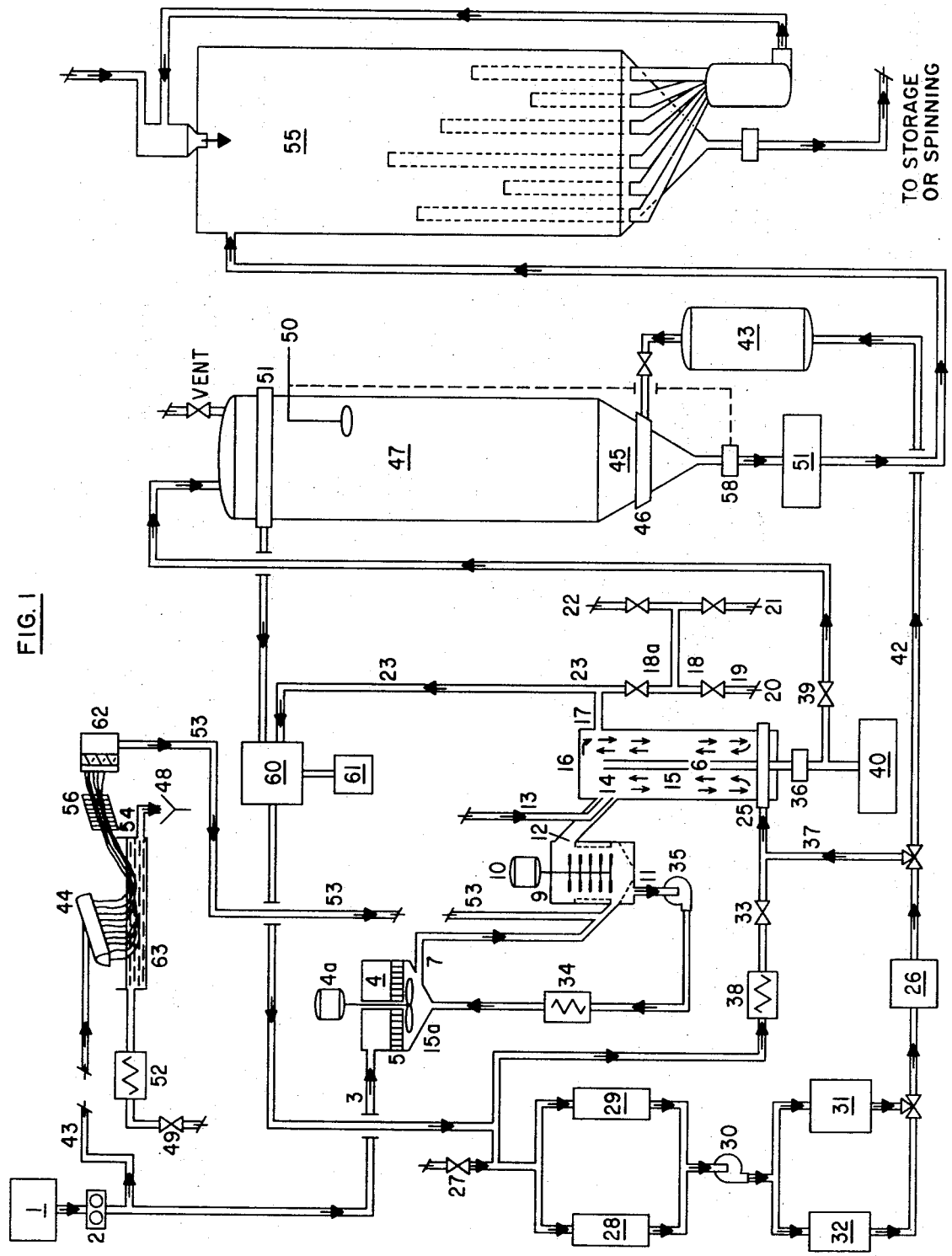

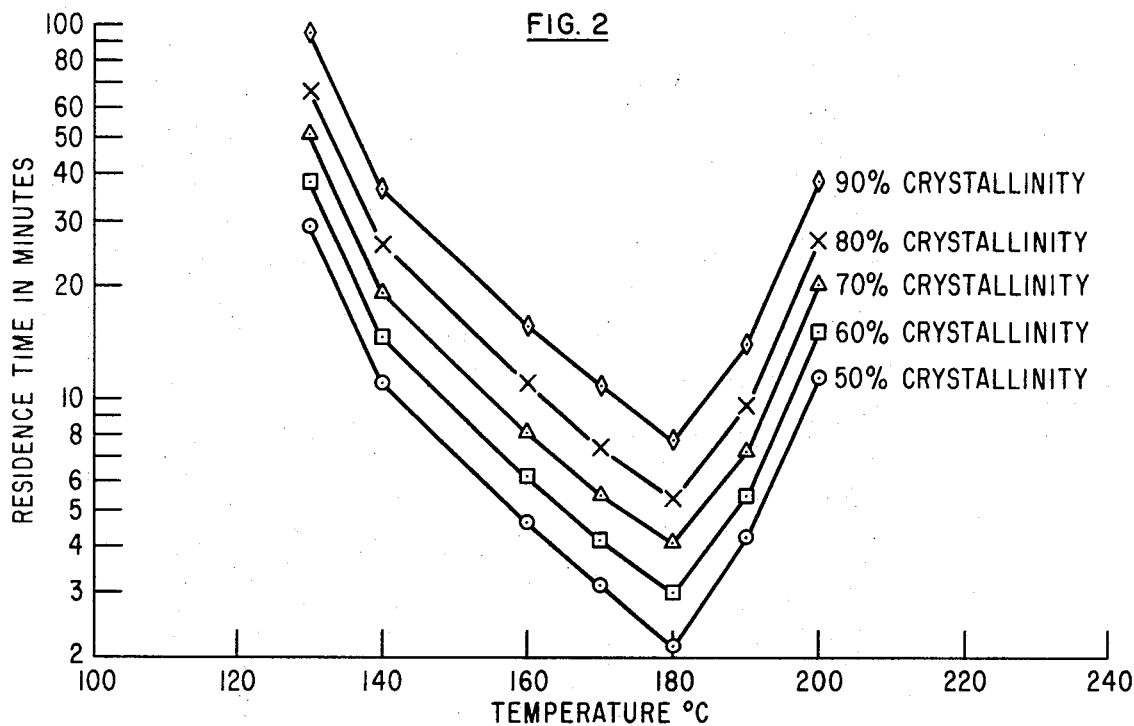
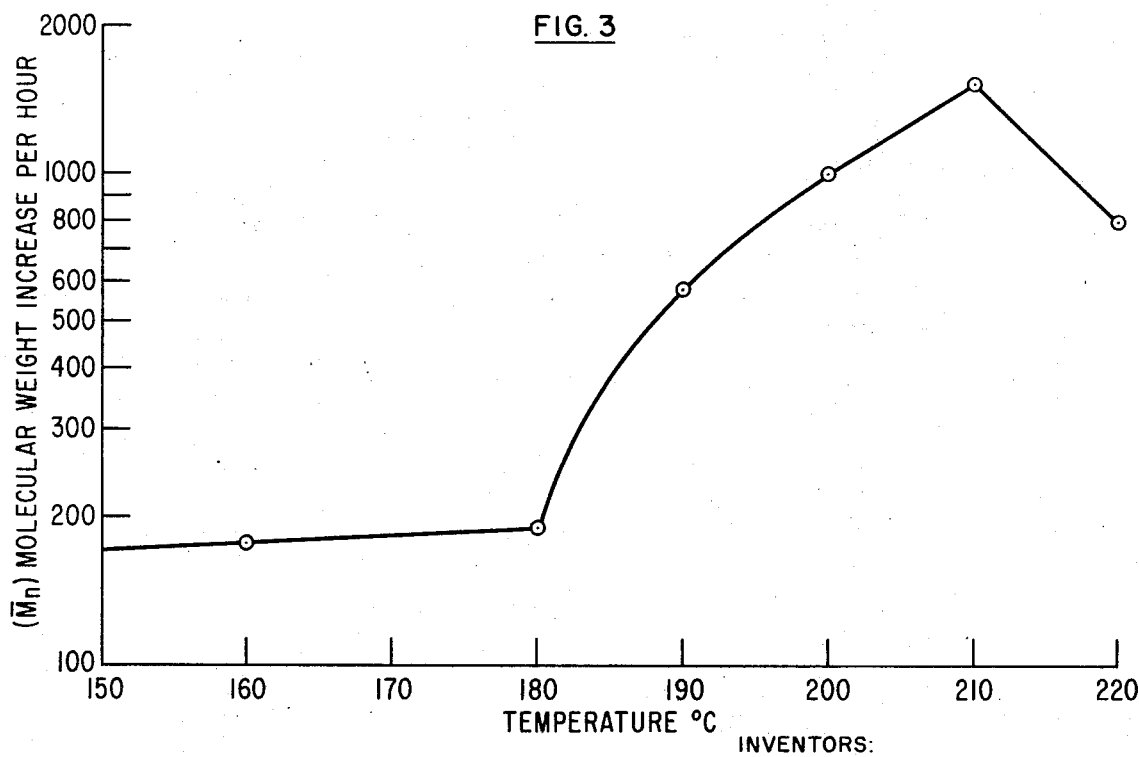

3,544,525
Patented Dec. 1, 1970

3,544,525
PROCESS FOR CRYSTALLIZATION, DRYING AND SOLID-STATE POLYMERIZATION OF POLYESTERS
Laszlo J. Balint, Chester, Va., Ramon Luis Abos, Wayne, Mich., and Orvill E. Snider, Petersburg, Va., assignors to Allied Chemical Corporation, New York, N.Y., a corporation of New York
Filed Mar. 26, 1968, Ser. No. 716,089
Int. Cl. C08g 17/003
U.S. Cl. 260—75                    8 Claims

ABSTRACT OF THE DISCLOSURE

Polyesters with a crystallization temperature at least 50° C. above their glass transition temperature are prepared in a continuous operation by contacting the molten polyester with a liquid such as water for a period of time sufficient to facilitate converting the polyester extrudate into pellets. The pellets are immediately removed from contact with the liquid or quenching medium before an equilibrium temperature is established in the pellets so that the maximum amount of heat possible is retained which reduces substantially the residence time in the crystallization chamber prior to entering a solid-state polymerization and/or drying tower directly from the crystallization chamber. The total time required to quench, pelletize, de-water and transfer the polyester pellets to a fluidized crystallization chamber is less than six seconds. Crystallization occurs in a few minutes in the fluidized zone and the crystallized pellets are passed directly to the drying and polymerization tower wherein solid-state polymerization is accomplished, if desired, under plug flow conditions utilizing a gas moving countercurrent to the polyester. The gas is heated to about 180–210° C. and moved at a superficial velocity of 0.5 to 2.0 ft./sec. for a period of time sufficient to achieve the desired molecular weight.

BACKGROUND OF THE INVENTION

The production of crystallized polyesters in particulate form heretofore has involved relatively massive and complex fluidization procedures. The processes employed have required large initial investments for equipment cost and have been expensive to operate. These disadvantages are caused at least in part by the relatively long crystallization cycles that are employed in the prior art processes. Another disadvantage resulting from the long crystallization periods is the deleterious effects of oxygen.

The particulate polyester must be crystallized at a temperature below its stick point temperature to avoid amalgamation of the polyester pellets into a solid and intractable mass. Several different types of processes for crystallizing polyester pellets are well known. The batch-type processes such as disclosed in U.S. Pat. No. 3,104,011 utilize means for treating the polyester pellets with mediums such as steam, toluene and water elevated to temperatures above 100° C. to achieve crystallization in a batch operation. The stick point temperature of a crystallized polyester is 230–240° C. However, prior to crystallization it may stick at temperatures above about 70° C.

While such processes represent an advancement over some earlier methods, they have certain undesired limitations. The prolonged crystallization times generally required in conjunction with the batch operation are not desirable for economic production of polyesters, especially for end uses which require polymers having very low moisture content. Such technology requires a considerable expenditure in utilities and time to reheat the polyester pellets to the desired temperature. Also, an occasional failure of a control mechanism results in the pellets setting up in an intractable mass.

The continuous processes employed heretofore generally involve massive equipment in relation to the quantity of polyester pellets dried. These methods utilize relatively long periods of crystallization, usually more than two hours. This is attributed to the failure of the practitioners to recognize the unexpected results which may be obtained if the polyester extrudate is contacted only briefly with a quench medium so as not to remove heat from the surface of the pellets other than as required to facilitate cutting into oblong or pillow-shaped pellets.

A further improvement in the technology for producing polyesters is represented by solid-state polymerization processes such as described in British Pat. No. 1,004,462 wherein solid-state polymerization is accomplished by grinding the particulate polyester to form a fine powder which is charged into a powder build-up reactor where it is vacuum purged to remove oxygen and heated in the presence of a polymerization catalyst while reducing the pressure to obtain the desired molecular weight. The problem encountered with these processes is the economic disadvantage imposed by the grinding operation and difficulty in obtaining uniform particle size. The large surface area available in powdered or ground polyester presents a substantially greater surface area to oxidation which results in a significant increase in breaks, wraps, and other defects when the polymer is spun or drawn into yarn. These defects are particularly troublesome in the production of polymer spinning systems that are difficult to control such as blends of polymers. Furthermore, as in the other processes discussed hereinabove, conventional quenching times and temperatures are employed whereby the particulate polyester is cooled to a temperature level low enough to permit grinding thereof.

In the production of the high molecular weight polyester for industrial end uses, mechanical difficulties are encountered in moving, stripping and purifying these products due to the high melt viscosity. The achievement of the high melt viscosity is realized through the maintenance of the molten polyester at prolonged residence times at high temperatures whereby product degradation occurs resulting in poor spun yarn properties characterized by an increase in breaks, wraps, drips and other spinning difficulties as a result of the oxidation and/or general degradation of the polymers.

With the foregoing discussion in mind, the provision of a process which reduces substantially the production costs of polyesters that can be shaped in articles having improved properties would represent a substantial improvement in the art.

SUMMARY OF THE INVENTION

The process of the present invention involves the rapid crystallization, drying and/or solid-state polymerization of polyesters for use primarily in the production of textile fibers. The process comprises the extrusion of a molten polymer through an extrusion die having multiple orifices. As the extrudate emerges from the orifices it is contacted with a liquid at 15–70° C. having a heat capacity of at least 0.6 cal./gram/° C. for about 0.01 to about 3 seconds to merely chill or solidify the skin or surface layers sufficiently to facilitate cutting the extrudate into pellets. The pellets are transferred immediately from contact with the liquid to a fluidized zone maintained at about 130–190° C., preferably 140–180° C., wherein the discrete particles are circulated for approximately 2 minutes with a hot gas having a superficial velocity of at least 2.3 ft./sec. As the pellets become crystallized, they are discharged from the fluidized zone and charged into a vessel for drying and/or solid-state polymerization. The temperature in this vessel is maintained at about 160–

210° C. by passing a hot gas through the polyester pellets until the desired moisture level and/or molecular weight level is reached. Superficial velocity is defined as the gas velocity calculated on the basis that the vessel is free of polymer.

Entrainment of the polyester particles in the heated gas to produce a fluidized bed is carried out in a vertical vessel having the inlets and outlets for introducing and removing the constituents properly disposed to achieve an efficient operation. Preferably, the particles are entrained in a fluid medium such as air and introduced into the vessel into the hot gas being circulated therein. Once the continuous operation is established, the incoming polyester is admixed with polyester pellets in the crystallizer vessel of which contains not more than 20 weight percent of noncrystallized polyester and the remaining 80 percent in said vessel having a crystallinity of at least 50 percent, as determined by density measurements. It is essential that these conditions be closely observed. If a greater quantity of noncrystallized material is present or if the remaining portion of the polyester possesses less than 50 percent crystallinity or if the zone of contact is not in mechanical motion equal to that obtainable in fluidized state or should the zone of feed of the noncrystallized material result in bypassing the crystallization zone, the polyester pellets will tend to stick together thereby forming an intractable mass which will plug outlet points in both the crystallization zone and within the drying column. Thus the sticky pellets cause severe mechanical difficulties which are obviously objectionable.

The polyesters which may be employed with this invention are substantially linear fiber-forming polyesters having recurring cyclic structure in the polymer backbone with an intrinsic viscosity in phenol:tetrachlorethane 60:40 weight ratio of from about 0.5 to 1.3 deciliters per gram. Viscosity is determined at 25° C. with solutions of the polymer in phenol:tetrachlorethane containing 0.5 gram of polymer per 100 milliliters of phenol:tetrachlorethane. The preferred polyester is polyethylene terephthalate although others may be employed, particularly those in which one component of the recurring unit in the polyester chain is derived from terephthalic acid, diphenyl methane p,p'dicarboxylic acid, diphenyl p-p'dicarboxylic acid, diphenyl ethane p,p'dicarboxylic acid, or napthalene dicarboxylic acids such as napthalene 2,6- and napthalene-2,7-dicarboxylic acids.

Various aliphatic glycols, generally 2–4 carbons and the trans and cis isomers of 1–4 cyclohexane dimethanol may be reacted with the indicated diacids. Block and random copolymers of these materials may be employed. However, if a random nonisomorphic copolymer is used, not more than 30 percent of a second polymer can be present, otherwise, the crystallinity and softening point are reduced below a usable range.

BRIEF DESCRIPTION OF THE DRAWINGS

FIG. 1 is a diagrammatical arrangement showing the equipment employed for carrying out the process of the present invention.

FIG. 2 is a graph wherein the residence time, in minutes, of the polyester pellets in the quench medium is plotted against the temperature of the pellets to illustrate the percent crystallinity achieved under the particular set of conditions.

FIG. 3 represents, graphically, the rate of molecular weight increase of the polyester as it occurs during solid-state polymerization in relation to the temperature.

DESCRIPTION OF THE PREFERRED EMBODIMENTS

Referring to the drawings in detail and particularly FIG. 1, molten polyester is supplied from a reactor vessel 1 via discharge from a screw pump, not shown, to a molten polymer pump 2 and is discharged through line 3 to an underwater pelletizer 4 which is of conventional design. Pressure developed by the polymer pump 2, which is in the region of 1,000 to 2,000 p.s.i.g., forces the melt out of an extrusion die 5 containing multiple orifices having diameters generally from about 0.10 to 0.15 inch. Usually extrusion dies having about 270 orifices are employed for an extrusion rate of about 2,000 to 4,000 pounds of polymer melt per hour. The orifices are spaced regularly around a four-inch diameter die plate. As the melt emerges from the face of the die plate, a knife positioned adjacent to the plate is rotated by motor 4a to sever the individually formed streams into pellets. A chamber 15a is formed between the housing of the underwater pelletizer 4 and the extrusion die 5.

In order to facilitate efficient cutting of the polymer streams into pellets, a quench medium such as water is introduced into chamber 15a to contact and solidify the emerging extrudate. Water having a specific heat capacity of about 1.0 cal./gram is supplied at a rate of approximately 100 gallons per minute and a velocity of at least 2.5 ft./sec. axial to the die plate 5 by recirculating pump 35. Prior to entering the chamber 15a the temperature of the water is adjusted to about 42° C. by a heat exchanger 34. After the pellets become entrained in the flow of water, both exit chamber 15a through line 7 at a water temperature of about 55° C. Since the temperature rise is greater than the amount of heat loss from the polyester pellets, it is expected that the excess heat is gained from the heated die plate.

The pressures, flow rates and speed of cutting blades are regulated to produce a pellet of between about 0.06 to 0.15 inch which is characterized by a length not greater than 1.5 times its diameter and not less than 0.6 times its diameter. Typically, it is preferred to have 80 percent of the pellets retained on a No. 8 U.S. screen and even more preferably, about 90 percent retained on a No. 8 U.S. screen. If water temperatures are higher than 70° C., there is a tendency for the pellets to fuse together and produce a nonuniform particle size for future operations. Additionally, at too high a temperature, there are elongated polymer tails and sheets or strings which result in an increase in the final product defects. At an inlet water temperature below 15° C., there is a tendency for pellets to freeze in the exit orifices of the die or become restricted at the exit thereof resulting in thin pellets and/or plugging of the die outlet holes. Therefore, it is highly preferable to control the polymer melt temperatures at the extrusion die 5 as near as practical to its solidification point since this contributes to the firmness of the emerging extrudate and results in a firmer, more uniform cut by the pelletizing knife. Cutting performance is further influenced by the diameter size of the polymer being cut which is determined by hole size, viscosity and temperature of the particular polymer being extruded. After extrusion and cutting the pellets are transferred from the underwater pelletizer 4 to a dewater unit 9. The velocity of water in chamber 15 is greater than 2.5 ft./sec. in the region of die plate.

Alternately, the molten polymer from pump 2 passes along line 43 and exits from extrusion die 44 as a series of strands and passes through a water bath 63 for a short distance then passes between upper and lower blow discs 56, 54 which may employ heated air to remove surface moisture. The strands then enter pelletizer 62 where polymer pellets of 0.06 to 0.15 inch diameter by 0.08 to 0.20 inch in length are cut. These pellets pass via line 53 into dewaterer 9. Chilled water enters through valve 49 and passes through heat exchanger 52 and overflows at 48. The water may be recirculated to heat exchanger 52 via a pumping system, not shown.

Centrifugal dewatering is accomplished by discharging the water at exit 11 in the bottom of the dewatering unit 9 and separating the pellets from the liquid bath through the rotation of a fan which is driven by motor 10. The pellets leave the dewatering unit at exit 12 and enter into a fluidizing column 15 through inlet 14 located approximately one-third the height of the vessel 16 from the top thereof. A gas flow is introduced into inlet 14 via line 13 from a source not shown to aid in the transfer of the pellets from the dewatering unit 9 to the fluidized zone. Once the pellets enter into vessel 15 they become entrained in a heated gas circulating within the confines of the vessel to establish a fluidized bed of the pellets. The heated gas enters through a plenum chamber 25 and exits through return line 23. The pellets become under the influence of the entering hot gas which establishes a fluidization flow of the pellets up the center of the vessel and down the sides until eventually after repetitive recirculations the pellets become crystallized and a portion of the recirculating quantity overflows into a central discharge 6 and exits through a rotary discharge means 36. Thus, there is a specific residence time during which polymer pellets are admixed with already crystallized pellets in column 15, and the pellets circulate past the pipe in the center of the column until eventual overflow occurs.

The gas employed for establishing the fluidizing column 15 of pellets has a dew point of less than 15° C. Moisture in the gas accelerates the crystallization. Preferably, an inert gas such as nitrogen or carbon dioxide is used during crystallization.

As shown in FIG. 1, the gas is circulated in through a closed system with make-up gas being introduced as necessary through valve 27. The gas is passed through a dryer bed 28, 29 upstream from a gas circulation blower 30 which forces the dried gas through a heat exchanger 31. The heated gas is passed through a candle filter 26 of at least ½ inch thickness and having a porosity of 1 to 2 microns. After being filtered, the gas enters the fluidization column 16 at 37 and/or at valve 33. Recirculation gas is used after passing through filter 38. A portion of the heated gas may bypass the fluidization column for purposes to be described later herein. The deoxygenator 32 is employed when an inert gas is used to avoid build up of oxygen which can occur with continuous recirculation. The deoxygenator 32 maintains oxygen below 50 parts per million and preferably below 20 parts per million.

The superficial velocity of the gas entering at 25 is greater than 2.3 ft./sec., preferably about 3.2 ft./sec. within the column 15, to keep the entire column in fluidized circulation. The fluidized gas having having oligomers and dust entrained therewith exits at 17 and impinges against a vertical pipeline 23 whereby the solids fall down toward valve 18. Thus, the entrained oligomers and dust that result from the fluidization motion are removed through line 19 at 20. The drain line 19 is purged by a vacuum line 21 and the inert gas line 22. Traces of violatile ethylene glycol and other very low molecular weight materials move through line 23 to a condenser 60 and then to storage tank 61 where they can be sent to the recovery process. It is important that polymer dust and skins be removed since these unwanted constituents produce many defects.

Generally, the polymer moisture is between 0.05 and 0.2 percent as it passes from the dewaterer at exit 12. Consequently, very little moisture must be removed from the polymer in subsequent drying operations. The low moisture content is attributed to the fact that the contact time between the extruded polyester and the quench medium is so short that only the skin layers are penetrated. For example, the total time required for extruding, cutting and dewatering the polyester pellets in accordance with the present invention is less than six seconds.

The temperature of the gas chamber 15 through plenum chamber 25 is controlled between about 130 and 190° C., but preferably about 150–180° C. since the maximum safe crystallization temperature occurs at this point for polyethylene terephthalate. As stated earlier herein, crystallization can be accomplished in a matter of minutes by the procedures of this invention as contrasted by hours with the prior art processes. The rapid crystallization achieved by the process of this invention is due to the maximum amount of heat retained in the polyester pellets at the time of entering the fluidized zone where crystallization occurs. For maximum crystallization rates it has been found that the temperature and contact time between the quench medium and the polyester should be controlled to the extent that the average temperature of the pellets does not drop below 130° C. Therefore, it is extremely important that the time required to transfer the pellets from the quenching zone to the fluidization zone be held to a minimum to avoid fusing of the pellets. Should the average temperature of the pellets drop substantially below 130° C., as is the conventional practice, a matter of hours is required in reheating and crystallizing the material.

The crystallization rates are related quite significantly to the temperature. Table I below illustrates the time required to achieve 60 percent crystallization of polyester pellets having an average temperature of about 130° C. when subjected to fluidized gas ranging in elevated temperatures of 130–200° C.

TABLE I

| Temperature at fluidized gas, ° C.: | Minutes to attain 60 percent crystallinity |
| --- | --- |
| 130 | 38 |
| 140 | 14.3 |
| 150 | 6.1 |
| 160 | 5.4 |
| 170 | 4.1 |
| 180 | 3.0 |
| 190 | 5.5 |
| 200 | 15.2 |

As can be seen from Table I, the preferred temperature conditions for optimized crystallization are between 150 and 190° C. At either higher or lower temperatures, a significant increase in time occurs. Furthermore, when the crystallization temperatures exceed 190° C., there is a tendency for the pellets to fuse together during the crystallization process even though agitated continuously. The data of Table I has been plotted graphically in FIG. 2 to better illustrate these results.

When the particles become crystallized in column 15 they overflow through the center pipe 6 and exit at the rotary discharge means 36 for transfer through valve 39 into a drying or solid-state polymerization tower 47. A receiver unit 40 is provided for storage to accommodate reloading of the crystallizer column 15, or for changeover in product or equipment repairs. The pellets may be dried further to remove moisture and glycol, or an increase in molecular weight may be effected through solid-state polymerization, depending upon the temperature of the heated gas and its volume. In the event solid-state polymerization is carried out it is desirable that an inert gas such as nitrogen or carbon dioxide be used. Generally burner gas, which is about 85 percent nitrogen, 12 percent $CO_2$ and 1–2 percent hydrogen and small amounts of methane and carbon monoxide, is employed to prevent oxidative degradation of the polymer. Degradation becomes apparent from a higher percentage of breaks and wraps in filaments spun therefrom.

The drying medium, whether an inert gas or air, is delivered through line 42 by blower 30 to a heater 43 where it is heated to a temperature between 160 and 212° C. prior to entering the bottom section 45 of the tower 47 through a plenum chamber 46. At temperatures above 212° C. there is a tendency for polyester pellets to tackify and stick. The gas velocity in tower 47 is below fluidization rates and therefore the gas moves upward through the mass of polyester pellets at a superficial velocity of below 2.1 ft./sec. After passing through the drying column the gas is exhausted through plenum chamber 51 into a gas return line which is connected to a volatile recovery system, 60, 61. Subsequent to removal of glycol and oligomers in condenser 60 and storage tank 61, the gas is returned to the gas recirculation system.

A level controller 50 is positioned near the top of tower 47 for controlling the residence time of the polymer within the tower. The discharge rotary valve 58 is actuated by the level control mechanism to release the material at the same rate of introduction. A receiver 51 is provided to function as a surge means on the continuous system in cases of product changeovers or equipment repair. The polymer, after having attained the desired molecular weight and/or purity is forwarded to a blender 55 where the pellets undergo a thorough blending prior to being forwarded to the spinning system, not shown. For a more detailed disclosure of the drying apparatus employed herein with regard to operating conditions see U.S. Pat. 3,266,156.

The following examples further illustrate the invention in greater detail.

EXAMPLES 1–6

In general, the molecular weight of polyester will increase principally as a function of the drying temperature employed, and the superficial velocity of the inert gas employed. This is shown in Table II, below, wherein Examples 1–6 demonstrate that an increase in molecular weight and increase in melting point is achieved up to 210° C.

TABLE II

| Example No. | 1 | 2 | 3 | 4 | 5 | [1] 6 | [2] 6a |
|---|---|---|---|---|---|---|---|
| Initial visc. OCP | 0.6 | 0.8 | 1.0 | 0.8 | 0.6 | 0.8 | 0.6 |
| Melting point, ° C | 252 | 258 | 262 | 258 | 254 | 258 | 258 |
| Mol. weight No., avg | 14,254 | 22,160 | 28,100 | 22,160 | 14,254 | 22,160 | 14,254 |
| Temp. of inert gas passing through drying column, ° C | 160 | 180 | 190 | 200 | 210 | 220 | 200 |
| Time in hrs., gas flow | 24 | 12 | 8 | 6 | 6 | 4 | 10 |
| OCP visc. after solid-state polymerization | 0.68 | 0.88 | 1.2 | 1.0 | 0.75 | 0.88 | 0.6 |
| Gas flow superficial velocity, ft/sec | 1.5 | 1.5 | 1.8 | 2.0 | 2.0 | 2.0 | 0 |
| Mol. wt. after polymerization | 17,800 | 25,000 | 32,700 | 28,100 | 23,200 | 26,000 | 14,254 |
| Mol. wt. increase per hour | 4,300 | 2,300 | 4,600 | 6,000 | 8,950 | 3,800 | 0 |
| Melt. point after stripping off impurities, ° C | 254 | 261 | 266 | 263 | 258 | 258 | 258 |
| Mol. wt. increase per hour | 180 | 192 | 580 | 1,000 | 1,500 | 800 | |

[1] This example showed an undersirable tendency to stick and there was no increase in melting point of the resulting polymer. Therefore, it is assumed that some degradation occured.
[2] Heated with a jacket; no gas flow employed.

The molecular weight increase is illustrated graphically in FIG. 3 as a function of temperature by plotting the rate of molecular weight increase per hour against the temperature at a constant gas flow of 2.0 ft./sec. superficial velocity. It will be noticed that the rate of increase is quite rapid for temperatures beginning at 180° C. and continues to increase until reaching 210° C. at which point the rate decreases rapidly. It may also be noticed that in the absence of sufficient inert gas flow or equivalent partial pressure reducing technique that essentially no rise in molecular weight occurs.

EXAMPLES 7–10

In Table III below, there is shown detailed Examples 7–10 illustrating specific conditions, properties and dimensions of apparatus which are employed for practicing the invention disclosed herein. The polymer employed in Examples 7–10 was polyethylene terephthalate.

TABLE III

| Example No. | 7 [1] | 8 [1] | 9 [1] | 0 [1] |
|---|---|---|---|---|
| Pounds molten PET polymer feed/hour | 4,000 | 4,000 | 10,000 | 10,000 |
| Viscosity OCP | 0.72 | 0.72 | 0.68 | 0.75 |
| Gas, c.f.m. [2] | 1,400 | 1,400 | 2,200 | 2,200 |
| Crystallizer temperature, ° C | 180 | 180 | 178 | 178 |
| Avg. percent crystallinity/res. time in minutes required to achieve crystallinity | 80/4 | 80/4 | 60/3 | 60/3 |
| Drying temp., ° C | 160 | 200 | 200 | 210 |
| Drying time, hours | 4 | 8 | 6 | 8 |
| Solid-state polymerization | No | Yes | Yes | Yes |
| DTA melting point before drying, ° C | 260 | 260 | 260 | 258 |
| DTA melting point after drying, ° C | 260 | 264 | 264 | 261 |
| OCP viscosity after drying | 0.72 | 0.95 | 0.86 | 1.32 |
| Molecular weight increase/hour | None | 1,000 | 1,000 | 1,500 |
| No. average molecular weight at start | 21,000 | 18,000 | 18,000 | 22,000 |
| No. average molecular weight at exit of drying tower | 21,000 | 26,800 | 24,000 | 34,400 |

[1] In Table III the residence time between the extrusion die and the crystallizer chamber for Examples 7–10 is 4, 4, 3, 3 seconds, respectively.
[2] Gas superficial velocity—2.9 ft/sec.
[3] Good.
[4] Very good.

The polymer lots that were processed by solid-state polymerization in accordance with the present invention exhibited a significant drop in breaks and wraps when spun into fibers. Approximately 50 percent less breaks and wraps were encountered. The improved properties are believed to be attributed to the removal of low molecular weight material from the polyester. Therefore, the foregoing improvements make the products of this invention particularly desirable for the production of fibers where spin-draw techniques are used.

In Examples 7–10 the height and diameter of the crystallizer, in feet, was 33/3, 33/3, 40/4 and 40/4, respectively. At a hight of less than 5 times the diameter of the crystallizer column considerable bypassing occurs which then caused mechanical difficulties due to sticking of said bypassing, low-crystallinity polyester. Using an overflow tube of less than 3 inches in diameter resulted in bridging and pluggage by the discharging polyester pellets. The drying or solid-state polymerization column employed for Examples 7–10 had a height and diameter in feet, respectively, of 40/5, 40/5, 72/10 and 72/10. For drying columns having a height less than 6 times the diameter noticeable polyester nonuniformity could be detected in the subsequent spinning and drawing opeartion because of the greater incidence of breaks and wraps. This was due to nonuniform moisture and melt viscosity for polyester pellets bypassing within the column.

The cross-sectional area of the drying column employed was 2.8 times greater than the crystallizer column for Examples 7 and 8 and 6.3 times greater for Examples 9 and 10. For a crystallizer having a cross-sectional area of less than 2.0, the manufacturing costs and mechanical problems make these operations unsatisfactory.

Although several specific examples of the inventive concept have been described, the invention should not be construed as limited thereby nor to the specific features mentioned except as set forth in the appended claims.

What is claimed is:

1. In a process for crystallizing and drying linear, fiber forming crystallizable polyesters having a crystallization activation temperature at least 50° C. above its glass transition temperature wherein the polyester is extruded in a molten state through a die plate to form individual strands which are reduced to pellets, the improvement which comprises surface quenching said extruded polyester strands at a temperature between 15 and 70° C. by contacting them with a liquid having a heat capacity of at least 0.6 cal./gram/° C. for a period not to exceed 3 seconds, pelletizing said surface quenched polyester strands to form pellets and maintaining the average temperature of said pellets above 130° C. until crystallization has been achieved, at least 60 percent crystallinity being attained within a period of 3 to 38 minutes.

2. The process of claim 1 in which at least 60 percent crystallinity of the pellets is attained within a period of 3 to 6.1 minutes.

3. The process of claim 1 in which the crystallization is accomplished in a fluidized zone with a heated gaseous medium moving at a superficial velocity of at least 2.3 ft./sec.

4. The process of claim 3 in which the gaseous medium is heated to between 130 and 190° C.

5. The process of claim 4 in which the residence time of the pellets within the fluidization zone is from about 2 to 30 minutes whereupon at least 50 percent crystallinity is obtained.

6. The process of claim 5 in which the temperature of the gas entering the crystallizer is maintained between about 150 and 180° C.

7. The process of claim 6 in which the pellets are continuously transferred from the fluidization zone to a drying tower after crystallization has occurred.

8. The process of claim 7 in which the pellets are dried and simultaneously solid-state polymerized by passing an inert gas therethrough at a superficial velocity of 0.5 to 2.1 feet/sec. and heated at a temperature of 180 to 212° C. until an intrinsic viscosity of between 0.7 and 1.3 deciliters per gram is attained.

References Cited

UNITED STATES PATENTS

| | | | |
|---|---|---|---|
| 2,850,764 | 9/1958 | Evans et al. | 18—1 |
| 2,901,466 | 8/1959 | Kibler et al. | 260—75 |
| 2,975,483 | 3/1961 | Cooper et al. | 18—47.5 |
| 3,075,952 | 1/1963 | Coover et al. | 260—75 |
| 3,342,782 | 9/1967 | Barkey | 260—75 |
| 3,405,098 | 10/1968 | Heighton et al. | 260—75 |

FOREIGN PATENTS 1,066,162   4/1967   Great Britain.

WILLIAM H. SHORT, Primary Examiner

M. GOLDSTEIN, Assistant Examiner

U.S. Cl. X.R.

23—273; 264—142, 143